US012430964B2

United States Patent
Kuramae et al.

(10) Patent No.: US 12,430,964 B2
(45) Date of Patent: Sep. 30, 2025

(54) INFORMATION PROCESSING SYSTEM AND INFORMATION PROCESSING METHOD

(71) Applicant: Panasonic Intellectual Property Management Co., Ltd., Osaka (JP)

(72) Inventors: Kenji Kuramae, Kanagawa (JP); Masao Akimoto, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 309 days.

(21) Appl. No.: 18/262,696

(22) PCT Filed: Jan. 14, 2022

(86) PCT No.: PCT/JP2022/001110
§ 371 (c)(1),
(2) Date: Jul. 24, 2023

(87) PCT Pub. No.: WO2022/172686
PCT Pub. Date: Aug. 18, 2022

(65) Prior Publication Data
US 2024/0096150 A1  Mar. 21, 2024

(30) Foreign Application Priority Data
Feb. 12, 2021 (JP) ................................. 2021-020799

(51) Int. Cl.
*G06F 21/45* (2013.01)
*G07C 9/00* (2020.01)
(Continued)

(52) U.S. Cl.
CPC ........ *G07C 9/00309* (2013.01); *H04L 9/0894* (2013.01); *H04L 9/3247* (2013.01); *H04L 9/3263* (2013.01); *G07C 2009/00412* (2013.01)

(58) Field of Classification Search
CPC ... H04L 9/0894; H04L 9/3247; H04L 9/3263; H04L 9/3268; H04L 9/08;
(Continued)

(56) References Cited

U.S. PATENT DOCUMENTS

| 2003/0154407 A1 | 8/2003 | Kato et al. |
| 2017/0243424 A1 | 8/2017 | Shirai et al. |

(Continued)

FOREIGN PATENT DOCUMENTS

| JP | 2003-233590 A | 8/2003 |
| JP | 2014-159692 A | 9/2014 |

(Continued)

OTHER PUBLICATIONS

International Search Report issued on Mar. 22, 2022 in International Patent Application No. PCT/JP2022/001110, with English translation.

*Primary Examiner* — Dionne Pendleton
(74) *Attorney, Agent, or Firm* — Rimon P.C.

(57) ABSTRACT

An information processing system includes: an information terminal; a first management device; and a control device. The information terminal receives a server certificate from the first management device. The control device includes: a storage in which a root certificate including a second public key is stored; a communicator that receives the server certificate from the information terminal; and a controller that verifies a signature included in the server certificate received, using the second public key included in the root certificate stored in the storage, and lifts the restriction imposed by a first device when the signature is successfully verified.

15 Claims, 10 Drawing Sheets

(51) Int. Cl.
*H04L 9/08* (2006.01)
*H04L 9/32* (2006.01)
*H04W 12/08* (2021.01)

(58) Field of Classification Search
CPC ........... H04L 2209/805; H04L 63/0442; H04L 63/045; H04L 63/0492; H04L 63/062; H04L 63/067; H04L 63/08; H04L 63/0823; H04L 63/0846; H04L 63/126; H04L 63/1441; H04L 9/32; H04L 9/3242; G07C 2009/00412; G07C 9/00309; G07C 2009/0023; G07C 2009/00642; G07C 2009/00746; G07C 2009/00769; G07C 2009/00801; G07C 2209/14; G07C 2209/63; G07C 9/00174; G07C 9/00571; G07C 9/0069; G06F 21/33; G06F 21/35; G06F 16/9566; G06F 21/31; G06F 21/32; G06F 21/60; G06F 21/6218; G06F 21/572; G06F 21/575; G06F 21/64; G06F 21/73; G06F 8/60; G06F 8/654; G06F 9/4411; E05B 49/00; H04W 12/041; H04W 12/06; H04W 12/08; H04W 12/47; G09C 1/00

See application file for complete search history.

(56) References Cited

U.S. PATENT DOCUMENTS

| | | |
|---|---|---|
| 2018/0159835 A1 | 6/2018 | Iida et al. |
| 2019/0220602 A1* | 7/2019 | Ruan ................... G06F 21/64 |
| 2021/0044976 A1* | 2/2021 | Avetisov ............ H04W 12/08 |
| 2022/0103374 A1 | 3/2022 | Ejiri et al. |
| 2022/0278840 A1* | 9/2022 | Ejiri ..................... H04W 4/80 |

FOREIGN PATENT DOCUMENTS

| | | |
|---|---|---|
| JP | 2016-111704 A | 6/2016 |
| JP | 6450360 B2 | 1/2019 |
| JP | 6667371 B2 | 3/2020 |
| JP | 6713612 B2 | 6/2020 |
| WO | 2017/006630 A1 | 1/2017 |

* cited by examiner

FIG. 5

| tbsCertificate |
| --- |
| Version |
| Serial number |
| Signature algorithm |
| Issuer of certificate |
| Validity period of certificate |
| Subject |
| Subject public key information |
| Extension |

| signatureAlgorithm |
| --- |
| signatureValue |

INFORMATION PROCESSING SYSTEM AND INFORMATION PROCESSING METHOD

CROSS-REFERENCE OF RELATED APPLICATIONS

This application is the U.S. National Phase under 35 U.S.C. § 371 of International Patent Application No. PCT/JP2022/001110, filed on Jan. 14, 2022, which in turn claims the benefit of Japanese Patent Application No. 2021-020799, filed on Feb. 12, 2021, the entire disclosures of which Applications are incorporated by reference herein.

TECHNICAL FIELD

The present invention relates to an information processing system and an information processing method.

Background Art

Security systems for locking or unlocking facility doors are conventionally known. Patent Literature (PTL) 1 discloses a security system that can safely and remotely lock and unlock a house without requiring other devices such as a fingerprint authentication device.

CITATION LIST

Patent Literature

[PTL 1] Japanese Unexamined Patent Application Publication No. 2014-159692

SUMMARY OF INVENTION

Technical Problem

Electric locks are known as devices for locking or unlocking facility doors. It can be said that an electric lock is a device that restricts the entry or exit of products or people.

The present invention provides an information processing system, etc., which are capable of authorizing an information terminal to lift a restriction on the entry or exit of products or people.

Solution to Problem

An information processing system according to one aspect of the present invention is an information processing system that is used to lift a restriction imposed by a first device which restricts entry or exit of a product or a person to or from a space. The information processing system includes: an information terminal; a first management device; and a control device. In the information processing system, the information terminal includes: a terminal storage in which a first private key and a first public key are stored; and a terminal communicator that transmits the first public key to the first management device, the first management device includes: a first storage in which a second private key and a second public key are stored; a first communicator that receives the first public key from the information terminal; and a first information processor that generates a signature for the first public key received, using the second private key, and causes the first communicator to transmit a server certificate including the first public key and the signature to the first communicator, the terminal communicator of the information terminal receives the server certificate from the first management device, and transmits the server certificate received to the control device, and the control device includes: a storage in which a root certificate including the second public key is stored; a communicator that receives the server certificate from the information terminal; and a controller that verifies the signature included in the server certificate received, using the second public key included in the root certificate stored in the storage, and lifts the restriction imposed by the first device when the signature is successfully verified.

An information processing system according to one aspect of the present invention is an information processing system that is used to lift a restriction imposed by a first device which restricts entry or exit of a product or a person to or from a first space. The information processing system includes: an information terminal; a first management device; a second management device; and a control device. In the information processing system, the second management device includes: a second storage in which a third private key and a third public key are stored; and a second communicator that transmits the third public key to the first management device, the first management device includes: a first storage in which a second private key and a second public key are stored; a first communicator that receives the third public key from the second management device; and a first information processor that generates a first signature for the third public key received, using the second private key, and causes the first communicator to transmit an intermediate certificate including the third public key and the first signature to the second management device, the second communicator receives the intermediate certificate from the first management device, the information terminal includes: a terminal storage in which a first private key and a first public key are stored; and a terminal communicator that transmits the first public key to the second management device, the second communicator receives the first public key from the information terminal, the second management device includes a second information processor that generates a second signature for the first public key received, using the third private key, and causes the second communicator to transmit: a server certificate including the first public key and the second signature; and the intermediate certificate received, to the information terminal, the terminal communicator receives the server certificate and the intermediate certificate from the second management device, and transmits the server certificate received and the intermediate certificate received, to the control device, and the control device includes: a storage in which a root certificate including the second public key is stored; a communicator that receives the server certificate and the intermediate certificate from the information terminal; and a controller that (i) verifies the first signature included in the intermediate certificate received, using the second public key included in the root certificate, (ii) verifies the second signature included in the server certificate received, using the third public key included in the intermediate certificate, and (iii) lifts the restriction imposed by the first device when each of the first signature and the second signature is successfully verified.

An information processing method according to one aspect of the present invention is an information processing method executed by an information processing system that is used to lift a restriction imposed by a first device which restricts entry or exit of a product or a person to or from a space. The information processing system includes: an information terminal including a terminal storage in which a first private key and a first public key are stored; a first management device including a first storage in which a second private key and a second public key are stored; and a control device including a storage in which a root certificate including the second public key is stored. The information processing method includes: transmitting, by the information terminal, the first public key to the first management device, and receiving, by the first management device, the first public key from the information terminal; generating, by the first management device, a signature for the first public key received, using the second private key; transmitting, by the first management device, a server certificate including the first public key and the signature to the information terminal, and receiving, by the information terminal, the server certificate from the first management device; transmitting, by the information terminal, the server certificate received to the control device, and receiving, by the control device, the server certificate from the information terminal; and verifying, by the control device, the signature included in the server certificate received, using the second public key included in the root certificate stored in the storage, and lifting, by the control device, the restriction imposed by the first device when the signature is successfully verified.

An information processing method according to one aspect of the present invention is an information processing method executed by an information processing system that is used to lift a restriction imposed by a first device which restricts entry or exit of a product or a person to or from a first space. The information processing system includes: an information terminal including a terminal storage in which a first private key and a first public key are stored; a first management device including a first storage in which a second private key and a second public key are stored; a second management device including a second storage in which a third private key and a third public key are stored; and a control device including a storage in which a root certificate including the second public key is stored. The information processing method includes: transmitting, by the second management device, the third public key to the first management device, and receiving, by the first management device, the third public key from the second management device; generating, by the first management device, a first signature for the third public key received, using the second private key; transmitting, by the first management device, an intermediate certificate including the third public key and the first signature to the second management device, and receiving, by the second management device, the intermediate certificate from the first management device; transmitting, by the information terminal, the first public key to the second management device, and receiving, by the second management device, the first public key from the information terminal; generating, by the second management device, a second signature for the first public key received, using the third private key; transmitting, by the second management device, (i) a server certificate including the first public key and the second signature and (ii) the intermediate certificate received, to the information terminal, and receiving, by the information terminal, the server certificate and the intermediate certificate from the second management device; transmitting, by the information terminal, the server certificate received and the intermediate certificate received, to the control device, and receiving, by the control device, the server certificate and the intermediate certificate from the information terminal; and verifying, by the control device, the first signature included in the intermediate certificate received, using the second public key included in the root certificate, verifying, by the control device, the second signature included in the server certificate received, using the third public key included in the intermediate certificate, and lifting, by the control device, the restriction imposed by the first device when each of the first signature and the second signature is successfully verified.

A recording medium according to one aspect of the present invention is a non-transitory computer-readable recording medium having recorded thereon a computer program for causing a computer to execute the above-described information processing method.

Advantageous Effects of Invention

An information processing system, etc. according to one aspect of the present invention are capable of authorizing an information terminal to lift a restriction on the entry or exit of products or people.

BRIEF DESCRIPTION OF DRAWINGS

FIG. 5 is a diagram illustrating an example of the format of the server certificate.

DESCRIPTION OF EMBODIMENTS

Hereinafter, embodiments will be described in detail with reference to the Drawings. It should be noted that the embodiments described below each show a general or specific example. The numerical values, shapes, materials, structural components, the arrangement and connection of the structural components, steps, the processing order of the steps, and so on, shown in the following embodiments are mere examples, and therefore do not limit the present invention. Among the structural components in the embodiments described below, those not recited in the independent claims will be described as optional structural components.

In addition, each diagram is a schematic diagram and not necessarily strictly illustrated. In each of the diagrams, substantially the same structural components are assigned with the same reference signs, and there are instances where redundant descriptions are omitted or simplified.

Embodiment 1

Configuration

Figure 1:
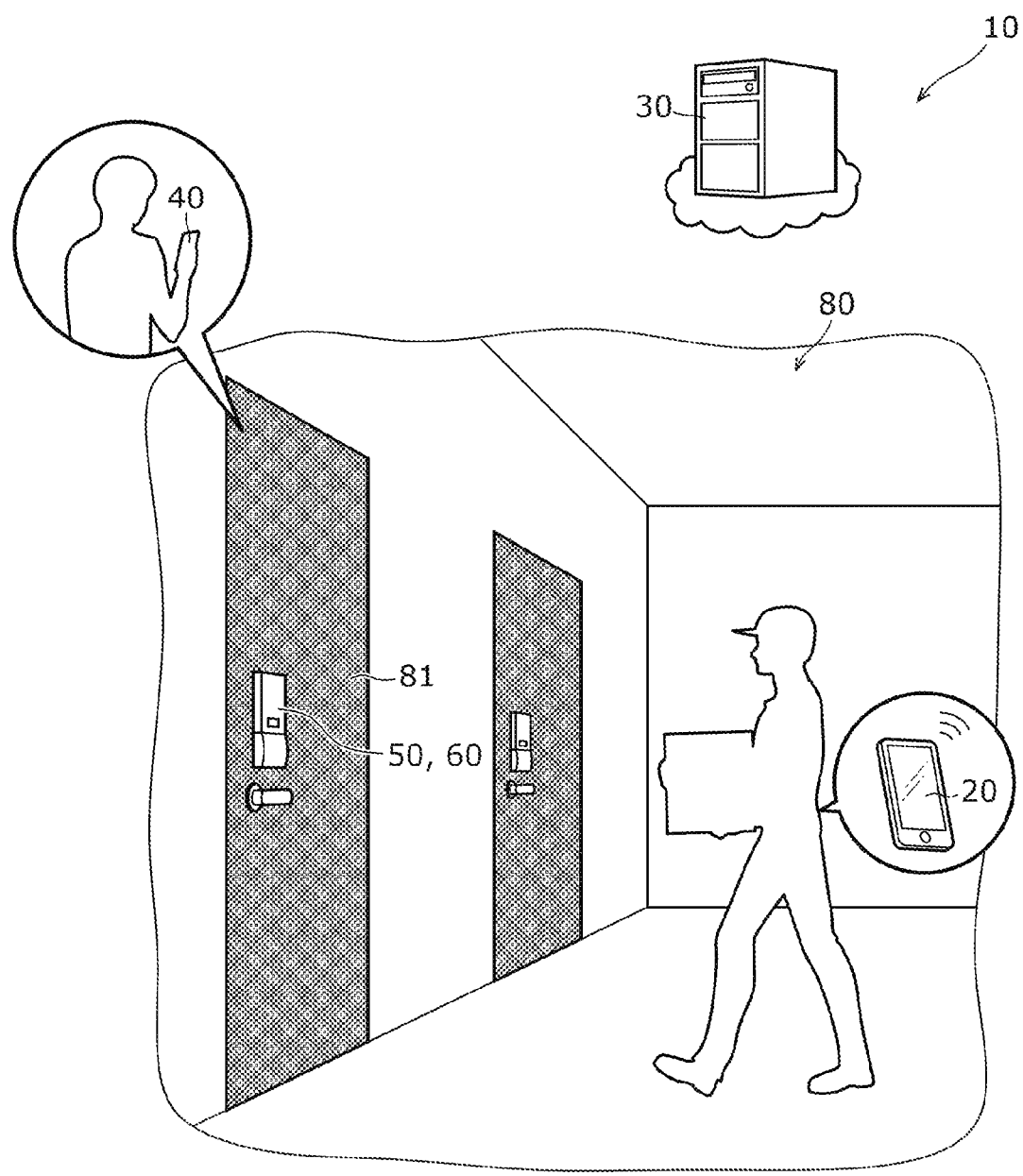
FIG. 1 is an external view of an information processing system according to Embodiment 1.
Figure 2:
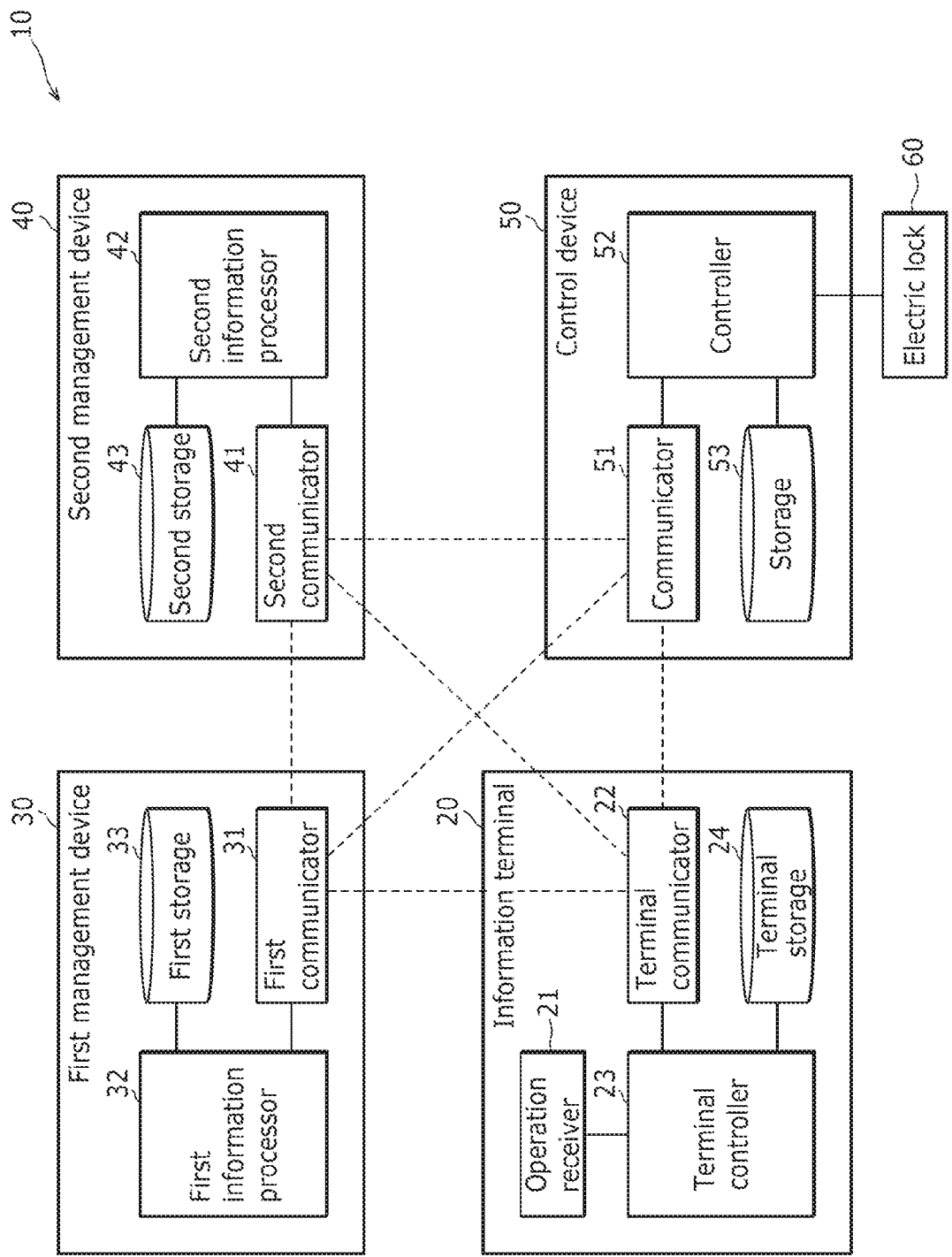
FIG. 2 is a block diagram illustrating a functional configuration of the information processing system according to Embodiment 1.

First, the configuration of an information processing system according to Embodiment 1 will be described. FIG. 1 is an external view of the information processing system according to Embodiment 1. FIG. 2 is a block diagram illustrating a functional configuration of the information processing system according to Embodiment 1.

As illustrated in FIG. 1, information processing system 10 according to Embodiment 1 is a system for authorizing information terminal 20 to unlock (or lock) electric lock 60 in order for a user to unlock electric lock 60 using information terminal 20. Information processing system 10 includes: information terminal 20; first management device 30; second management device 40; control device 50; and electric lock 60. Control device 50 and electric lock 60 are provided, for example, on door 81 (or a door frame) in facility 80 as an electric lock system. Facility 80 is, for example, a complex housing, but it may be a non-residential facility such as an office building.

Information terminal 20 is an information terminal that is used by a visitor to facility 80 to unlock electric lock 60. Information terminal 20 is a portable information terminal, such as a smartphone or a tablet device. Information terminal 20 includes: operation receiver 21; terminal communicator 22; terminal controller 23; and terminal storage 24.

Operation receiver 21 receives an operation performed by the user. Operation receiver 21 is implemented by, for example, a touch panel, but may also be implemented by a hardware key, etc.

Terminal communicator 22 is a communication circuit for information terminal 20 to communicate with each of first management device 30, second management device 40, and control device 50. Terminal communicator 22, for example, performs wireless communication with first management device and second management device 40 through a wide-area communication network such as the Internet, and performs wireless communication with control device 50 through a local communication network.

Terminal controller 23 performs information processing, etc. for unlocking electric lock 60. Terminal controller 23 is implemented by, for example, a microcomputer, but may also be implemented by a processor. The functions of terminal controller 23 are implemented by, for example, executing a computer program stored in terminal storage 24, by a microcomputer, processor, or the like included in terminal controller 23.

Terminal storage 24 is a storage device in which information necessary for the above-described information processing and the above-described computer program, etc. are stored. Terminal storage 24 is implemented by, for example, a semiconductor memory.

First management device 30 is an information terminal used by a manager or the like of facility 80. The manager or the like is, for example, an owner of facility 80 or an employee of a facility management agent for facility 80. First management device 30 is a stationary information terminal such as a personal computer or a server device, but may also be a portable information terminal. First management device 30 includes: first communicator 31; first information processor 32; and first storage 33.

First communicator 31 is a communication circuit for first management device 30 to communicate with each of information terminal 20, second management device 40, and control device 50. First communicator 31 performs, for example, communication with each of information terminal 20, second management device 40, and control device 50 through a wide-area communication network. First communicator 31 may perform wired or wireless communication.

First information processor 32 performs information processing for authorizing information terminal 20 to unlock electric lock 60. First information processor 32 is implemented by, for example, a microcomputer, but may also be implemented by a processor. The functions of first information processor 32 are implemented by, for example, executing a computer program stored in first storage 33, by a microcomputer, processor, or the like included in first information processor 32.

First storage 33 is a storage device in which information necessary for the above-described information processing and the above-described computer program, etc. are stored. First storage 33 is implemented by, for example, a hard disk drive (HDD), but may also be implemented by a semiconductor memory.

Second management device 40 is an information terminal used by a resident or the like of facility 80. Second management device 40 is, for example, a portable information terminal, but may also be a stationary information terminal such as a personal computer or a server device. Second management device 40 includes: second communicator 41; second information processor 42; and second storage 43.

Second communicator 41 is a communication circuit for second management device 40 to communicate with each of information terminal 20, first management device 30, and control device 50. Second communicator 41 performs, for example, communication with each of information terminal 20, first management device 30, and control device 50 through a wide-area communication network. Second communicator 41 may perform wired or wireless communication.

Second information processor 42 performs information processing for authorizing information terminal 20 to unlock electric lock 60. Second information processor 42 is implemented by, for example, a microcomputer, but may also be implemented by a processor. The functions of second information processor 42 are implemented by, for example, executing a computer program stored in second storage 43, by a microcomputer, processor, or the like included in second information processor 42.

Second storage 43 is a storage device in which information necessary for the above-described information processing and the above-described computer program, etc. are stored. Second storage 43 is implemented, for example, by a semiconductor memory.

Control device 50 is a control device that controls the locking and unlocking of electric lock 60. Control device 50 is, for example, built into door 81 or a door frame. Control device 50 includes communicator 51, controller 52, and storage 53.

Communicator 51 is a communication circuit for control device 50 to communicate with each of information terminal 20, first management device 30, and second management device 40. Communicator 51, for example, performs wireless communication with information terminal 20 through a local communication network, and performs wireless communication with first management device 30 and second management device through a wide-area communication network.

Controller 52 performs information processing for locking or unlocking electric lock 60. More specifically, controller 52 locks or unlocks electric lock 60 by outputting a control signal to electric lock 60. Controller 52 is implemented by, for example, a microcomputer, but may also be implemented by a processor. The functions of controller 52 are implemented by, for example, executing a computer program stored in storage 53, by a microcomputer, processor, or the like included in controller 52.

Storage 53 is a storage device in which information necessary for the above-described information processing and the above-described computer program, etc. are stored. Storage 53 is implemented, for example, by a semiconductor memory.

Electric lock 60 locks or unlocks door 81 based on a control signal output from controller 52. More specifically, electric lock 60 includes an electric motor and a transmission mechanism that transmits the driving force of the electric motor to the deadbolt. The driving force of the electric motor is transmitted to the deadbolt via the transmission mechanism, thereby causing the deadbolt to move to the locked or unlocked position.

Operation Example 1

Figure 3:
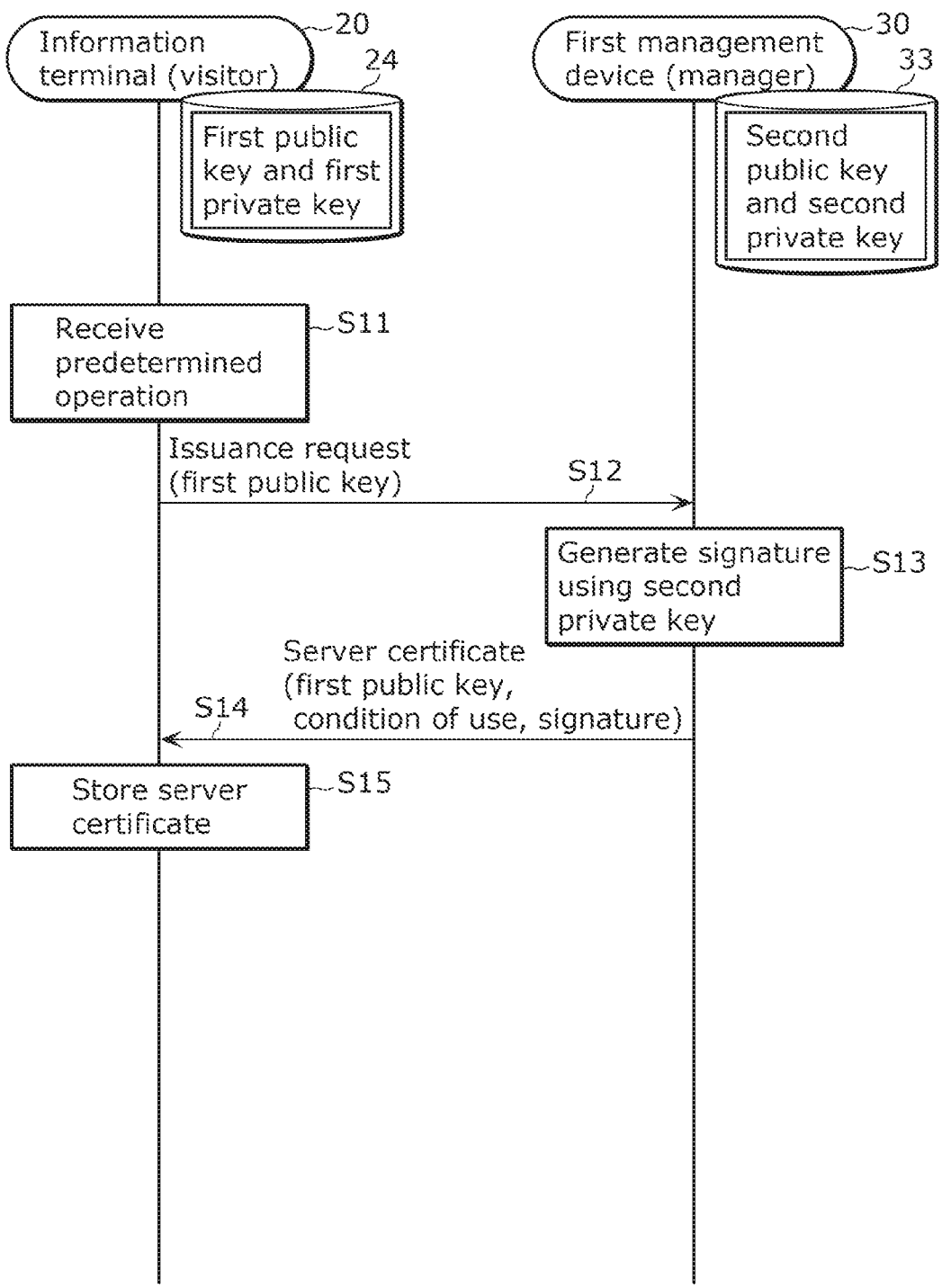
FIG. 3 is a sequence diagram of the first half of operation example 1 of the information processing system according to Embodiment 1.
Figure 4:
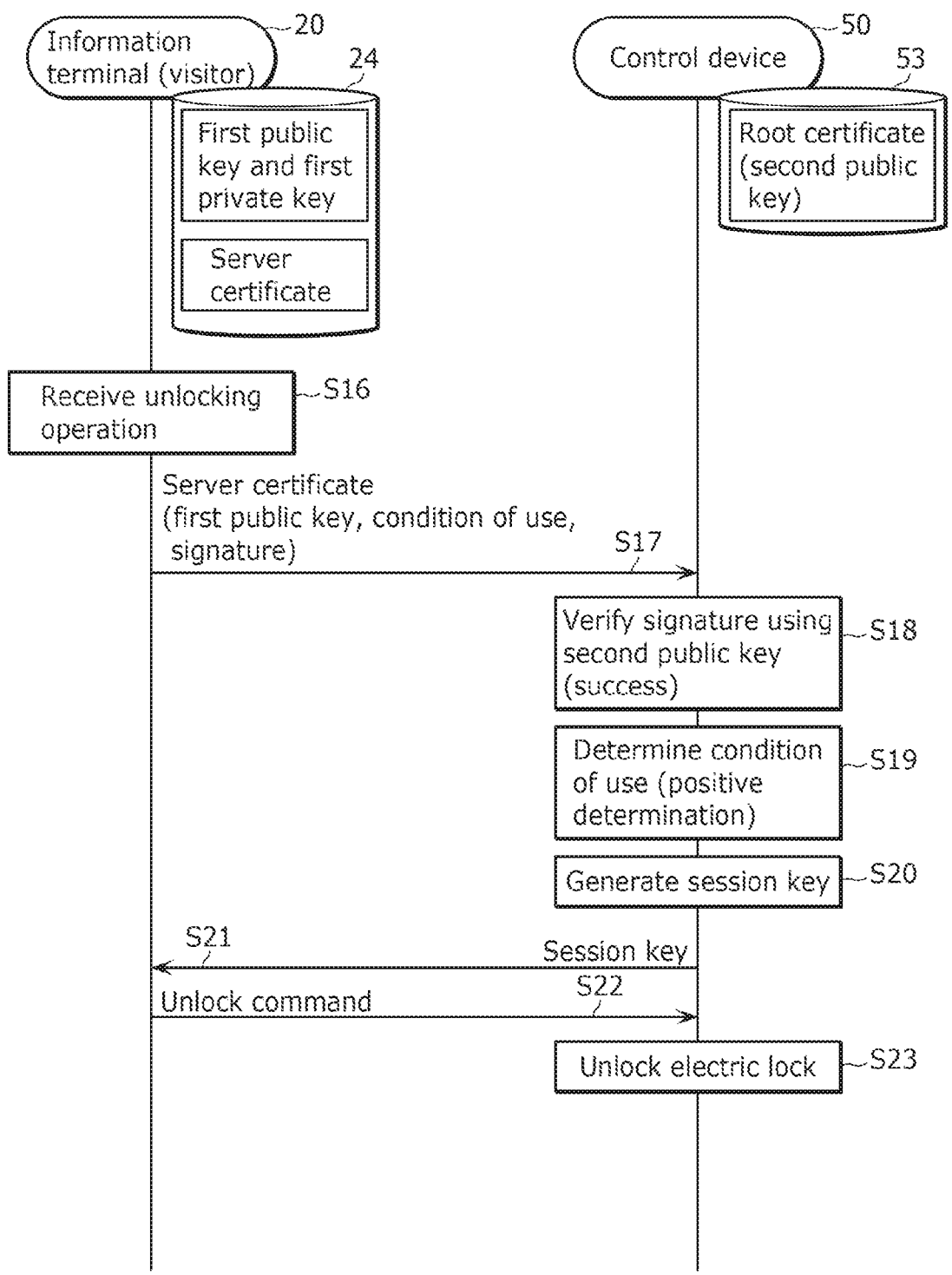
FIG. 4 is a sequence diagram of the second half of operation example 1 of the information processing system according to Embodiment 1.

Next, operation example 1 of information processing system 10 will be described. FIG. 3 and FIG. 4 are sequence diagrams of operation example 1 of information processing system 10. The following operation example 1 will be described as information terminal 20 being used by a visitor to facility 80, and first management device 30 being used by the manager or the like of facility 80. The visitor is, for example, a person dispatched by a housekeeping service provider, a package delivery person, or the like.

First, the operation until a server certificate is stored in terminal storage 24 of information terminal 20 will be described with reference to FIG. 3. The server certificate serves as a permit to unlock electric lock 60. As illustrated in FIG. 3, a first public key and a first private key are stored in terminal storage 24 of information terminal 20. The first public key and the first private key are generated, for example, when an application program (hereinafter also referred to simply as "application") for using information processing system 10 is installed on information terminal 20, and stored in terminal storage 24.

In addition, a second public key and a second private key are stored in first storage 33 of first management device 30. The second public key and the second private key are stored in first storage 33, for example, when an application for using information processing system 10 is installed on first management device 30.

First, the visitor performs a predetermined operation on operation receiver 21 of information terminal 20 which is running the above-described application. The predetermined operation is the operation to install a server certificate. Operation receiver 21 receives the predetermined operation (S11).

When the predetermined operation is received by operation receiver 21, terminal controller 23 generates an issuance request which is a request to issue a server certificate, and causes terminal communicator 22 to transmit the generated issuance request to first management device 30. The issuance request includes the first public key. In other words, terminal communicator 22 transmits the first public key to first management device 30 (S12). It should be noted that terminal communicator 22 transmits the first public key to first management device 30 through wireless communication over a wide area communication network.

First communicator 31 of first management device 30 receives the issuance request including the first public key. When the manager confirms the issuance request of the visitor and permits the visitor to unlock electric lock 60, first information processor 32 generates a signature for the received first public key and a condition of use, using the second private key (S13). In addition, first information processor 32 causes first communicator 31 to transmit the server certificate including the first public key, the condition of use, and the signature to information terminal 20 (S14). The condition of use is, for example, information indicating a temporal condition (in other words, a validity period), which is predetermined by, for example, the manager, etc. using first management device 30.

It should be noted that an X.509 certificate, for example, is used as the format of the server certificate. FIG. 5 is a diagram illustrating an example of the format of the server certificate. The validity period of the certificate in FIG. 5 corresponds to the above-described condition of use, subject public key information corresponds to the first public key, and signature Value corresponds to the signature. It should be noted that a condition of use other than the validity period may be stored in the extension area of the format in FIG. 5.

Terminal communicator 22 of information terminal 20 receives the server certificate. Terminal controller 23 stores the received server certificate in terminal storage 24 (S15).

Next, the operation until electric lock 60 is unlocked using a server certificate will be described with reference to FIG. 4. As illustrated in FIG. 4, a root certificate is stored in storage 53 of control device 50. The root certificate includes the second public key. The root certificate is, for example, generated by first information processor 32 of first management device 30 and transmitted to control device 50 by first communicator 31, thereby being stored in storage 53. The root certificate may be stored in storage 53 by the manufacturing facility at the time of manufacture of control device 50.

First, a visitor approaches door 81 and performs, on operation receiver 21 of information terminal 20 which is running the above-described application, a predetermined unlocking operation to unlock electric lock 60. Operation receiver 21 receives the unlocking operation (S16). It should be noted that door 81 is, for example, a door provided in a private area of facility 80 (see FIG. 1), but door 81 may also be a door provided at the entrance of facility 80 or a door provided in a common area other than the entrance.

When the unlocking operation is received by operation receiver 21, terminal controller 23 causes terminal communicator 22 to transmit a server certificate to control device 50. In other words, terminal communicator 22 transmits the server certificate to control device 50 (S17). Terminal communicator 22 transmits the server certificate to control device 50 via wireless communication through the local communication network. This wireless communication is, for example, short-distance wireless communication based on communication standards such as Bluetooth (registered trademark).

Communicator 51 of control device 50 receives the server certificate. Controller 52 verifies the signature included in the received server certificate, using the second public key included in the root certificate stored in storage 53 (S18). When the signature is successfully verified, controller 52 determines the condition of use included in the server certificate (S19). As described above, the condition of use is, for example, a temporal condition, and controller 52 determines whether the temporal condition is satisfied. When controller 52 determines that the temporal requirement is satisfied, controller 52 generates a session key using the first public key included in the server certificate (S20). Controller 52 encrypts the generated session key with the first public key, and causes communicator 51 to transmit the encrypted session key to information terminal 20 (S21).

Terminal communicator 22 of information terminal 20 receives the encrypted session key. Terminal controller 23 decrypts the session key using the first private key, and causes terminal communicator 22 to transmit an unlock command to control device 50 by encrypted communication using the session key (S22).

Communicator 51 of control device 50 receives the unlock command. Controller 52 unlocks electric lock 60 based on the received unlock command (S23). More specifically, controller 52 unlocks electric lock 60 by transmitting a control signal to electric lock 60. It should be noted that information terminal 20 is also capable of locking electric lock 60 based on a similar sequence of operation.

As described above, in information processing system 10, first management device 30 is capable of securely authorizing information terminal 20 to unlock electric lock 60, using the server certificate and the root certificate.

Although not illustrated in the diagrams, second management device 40, in the same manner as first management device 30, is also capable of securely authorizing information terminal 20 to unlock electric lock 60, using a server certificate and a root certificate. In other words, in the sequence diagram in FIG. 3, first management device 30 and the structural components thereof may be replaced with second management device 40 and the structural components thereof. For example, when first management device 30 is used by the manager of facility 80 and second management device 40 is used by the resident of facility 80, the manager and the resident can each authorize a visitor to enter facility 80.

In addition, when the root certificate (the second public key) corresponding to first management device 30 and the root certificate (third public key) corresponding to second management device 40 are stored in storage 53 of control device 50, a visitor who is authorized to enter by the manager and a visitor who is authorized to enter by the resident both can unlock electric lock 60 using their own information terminals 20.

It should be noted that the object of control of control device 50 is not limited to electric lock 60. It is sufficient if control device 50 controls any device that restricts entry into or exit from a space in facility 80, for example, control device 50 may control the opening and closing of automatic door 70 (described below) provided at the entrance of facility 80.

Operation Example 2

Figure 6:
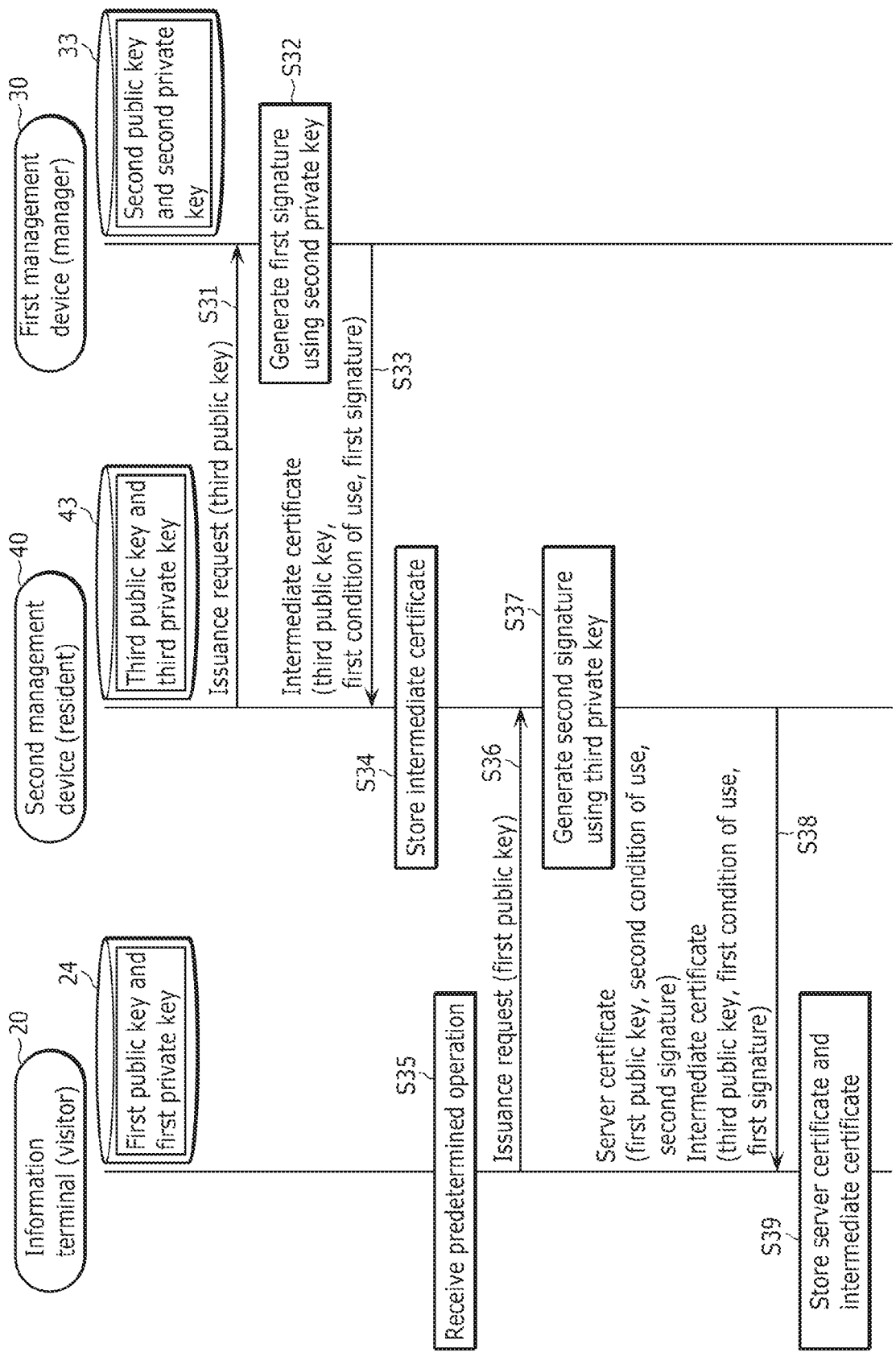
FIG. 6 is a sequence diagram of the first half of operation example 2 of the information processing system according to Embodiment 1.
Figure 7:
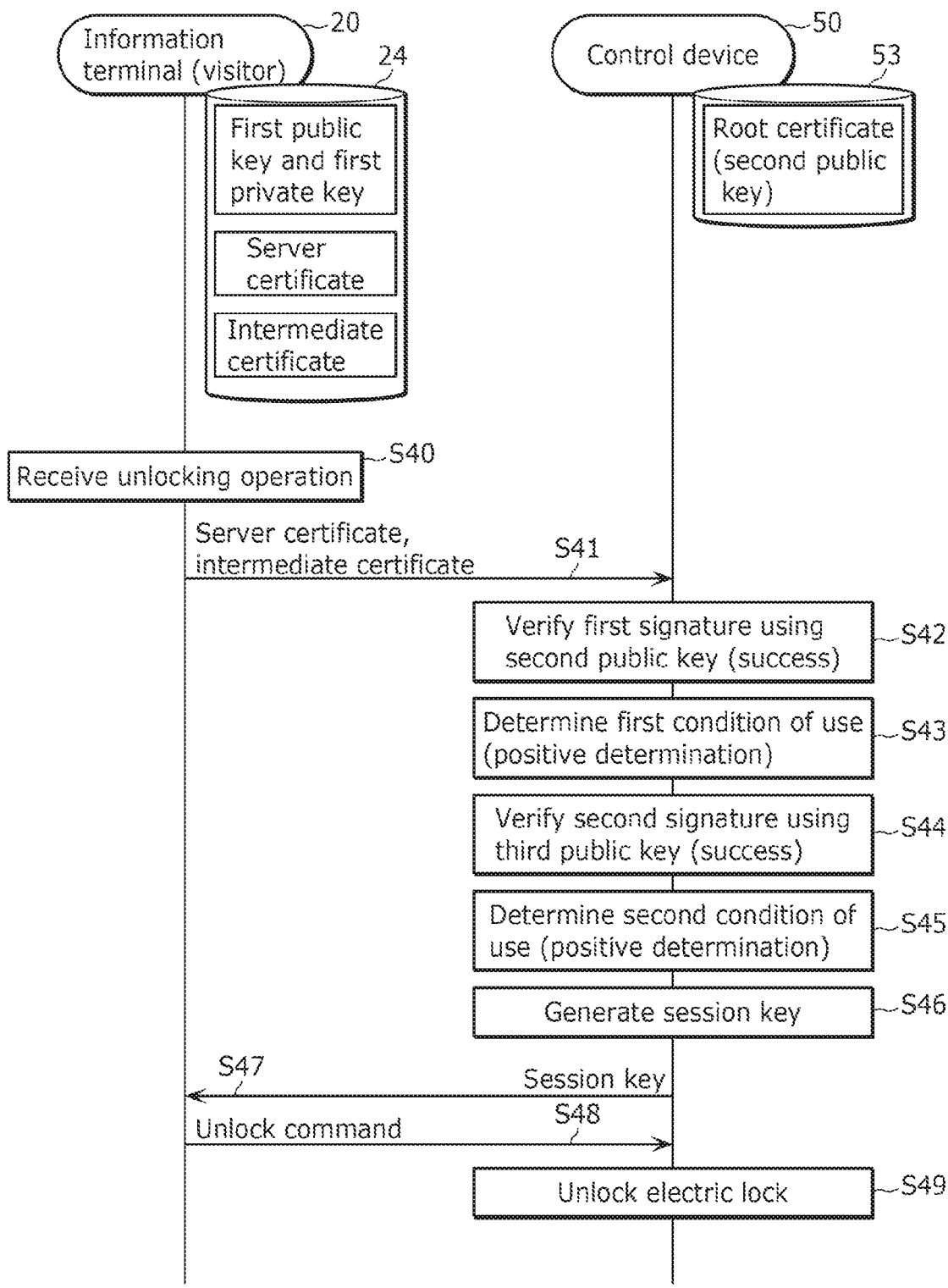
FIG. 7 is a sequence diagram of the second half of operation example 2 of the information processing system according to Embodiment 1.

Next, operation example 2 of information processing system 10 will be described. FIG. 6 and FIG. 7 are sequence diagrams of operation example 2 of information processing system 10. In the following operation example 2, first management device 30 functions as a root certification authority (CA) and second management device 40 functions as an intermediate CA. The following operation example 2 will be described as information terminal 20 being used by a visitor to facility 80, and first management device 30 being used by a manager of facility 80 (e.g., an owner of facility 80 or an employee of a facility management agent for facility 80). Second management device 40 will be described as being used by a resident or the like in facility 80. It should be noted that, in the description of operation example 2, the description of the matters described in operation example 1 will be omitted as appropriate.

First, the operation until an intermediate certificate is stored in second storage 43 of second management device 40 will be described with reference to FIG. 6. As illustrated in FIG. 6, a second public key and a second private key are stored in first storage 33 of first management device 30. A third public key and a third private key are stored in second storage 43 of second management device 40. A first public key and a first private key are stored in terminal storage 24 of information terminal 20.

First, second information processor 42 of second management device 40 generates an issuance request which is a request to issue an intermediate certificate, based on an operation performed by a resident, etc., and causes second communicator 41 to transmit the generated issuance request to first management device 30. The issuance request includes the third public key. In other words, second communicator 41 transmits the third public key to first management device 30 (S31). It should be noted that second communicator 41 transmits the third public key to first management device 30 through communication over a wide area communication network.

First communicator 31 of first management device 30 receives the issuance request including the third public key. When the manager confirms the issuance request of the resident and permits the resident to issue a server certificate, first information processor 32 generates a first signature for the received third public key and a first condition of use, using the second private key (S32). In addition, first information processor 32 causes first communicator 31 to transmit the intermediate certificate including the third public key, the first condition of use, and the first signature to second management device 40 (S33). The first condition of use is, for example, information indicating a temporal condition (in other words, a validity period), which is predetermined by, for example, the manager or the like who uses first management device 30.

It should be noted that the above-described X.509 certificate as illustrated in FIG. 5, for example, is used as the format of the intermediate certificate.

Second communicator 41 of second management device 40 receives the intermediate certificate. Second information processor 42 causes the received intermediate certificate to be stored in second storage 43 (S34).

Then, the visitor performs a predetermined operation on operation receiver 21 of information terminal 20 which is running the above-described application. The predetermined operation is the operation to install the server certificate and the intermediate certificate. Operation receiver 21 receives the predetermined operation (S35).

When the predetermined operation is received by operation receiver 21, terminal controller 23 generates an issuance request which is a request to issue the server certificate and the intermediate certificate, and causes terminal communicator 22 to transmit the generated issuance request to second management device 40. The issuance request includes the first public key. In other words, terminal communicator 22 transmits the first public key to second management device 40 (S36). It should be noted that terminal communicator 22 transmits the first public key to second management device 40 through wireless communication over a wide area communication network.

Second communicator 41 of second management device 40 receives the issuance request including the first public key. When the resident confirms the issuance request of the visitor and permits the visitor to unlock electric lock 60, second information processor 42 generates a second signature for the received first public key and a second condition of use, using the third private key (S37). In addition, second information processor 42 causes second communicator 41 to transmit, to information terminal 20; the server certificate including the first public key, the second condition of use, and the second signature; and the intermediate certificate received in Step S33 (in other words, stored in second storage 43) (S38). The second condition of use is, for example, information indicating a temporal condition (in other words, a validity period), which is predetermined by, for example, the resident or the like using second management device 40. It should be noted that the X.509 certificate, for example, is used as the format of the server certificate.

Terminal communicator 22 of information terminal 20 receives the server certificate and the intermediate certificate. Terminal controller 23 stores the received server certificate and the intermediate certificate in terminal storage 24 (S39).

Next, the operation until electric lock 60 is unlocked using the server certificate and the intermediate certificate will be described with reference to FIG. 7. As illustrated in FIG. 7, a root certificate is stored in storage 53 of control device 50. In operation example 2, the root certificate includes the second public key. The root certificate is, for example, generated by first information processor 32 of first management device 30 and transmitted to control device 50 by first communicator 31, thereby being stored in storage 53. The root certificate may be stored in storage 53 by the manufacturing facility at the time of manufacture of control device 50.

A visitor approaches door 81 and performs, on operation receiver 21 of information terminal 20 which is running the above-described application, a predetermined unlocking operation to unlock electric lock 60. Operation receiver 21 receives the unlocking operation (S40). When the unlocking operation is received by operation receiver 21, terminal controller 23 causes terminal communicator 22 to transmit the server certificate and the intermediate certificate to control device 50. In other words, terminal communicator 22 transmits the server certificate and the intermediate certificate to control device 50 (S41). Terminal communicator 22 transmits the server certificate and the intermediate certificate to control device 50 via wireless communication through the local communication network.

Communicator 51 of control device 50 receives the server certificate and the intermediate certificate. Controller 52 verifies the first signature included in the received intermediate certificate, using the second public key included in the root certificate stored in storage 53 (S42). When the first signature is successfully verified, controller 52 determines the first condition of use included in the intermediate certificate (S43).

When the first condition of use is successfully determined, controller 52 verifies the second signature included in the received server certificate, using the third public key included in the intermediate certificate (S44). When the second signature is successfully verified, controller 52 determines the second condition of use included in the server certificate (S45). The processes in subsequent Steps S46 through S49 are performed in the same manner as the processes performed in Steps S20 through S23 in operation example 1, and finally electric lock 60 is unlocked. It should be noted that information terminal 20 is also capable of locking electric lock 60 based on a similar sequence of operation.

As described above, in information processing system 10, second management device 40 is capable of authorizing information terminal 20 to unlock electric lock 60. It should be noted that, although not illustrated in the diagrams, first management device 30 may issue a server certificate to second management device 40 in operation example 2. In this case, second management device 40 is capable of unlocking electric lock 60 by obtaining the server certificate issued by first management device 30 and transmitting the server certificate to control device 50. In other words, in operation example 2, first management device 30 is capable of authorizing second management device 40 to unlock electric lock 60 and to issue a server certificate (authority to authorize information terminal 20 to unlock electric lock 60).

As described above, when the user of second management device 40 is a resident, the resident can unlock electric lock 60 of the private area on which the resident has a contract while residing in facility 80, and can permit a visitor to unlock electric lock 60 of the private area while residing in facility 80. It should be noted that the server certificate issued by second management device 40 can be invalidated by first management device 30.

Embodiment 2

Configuration

Figure 8:
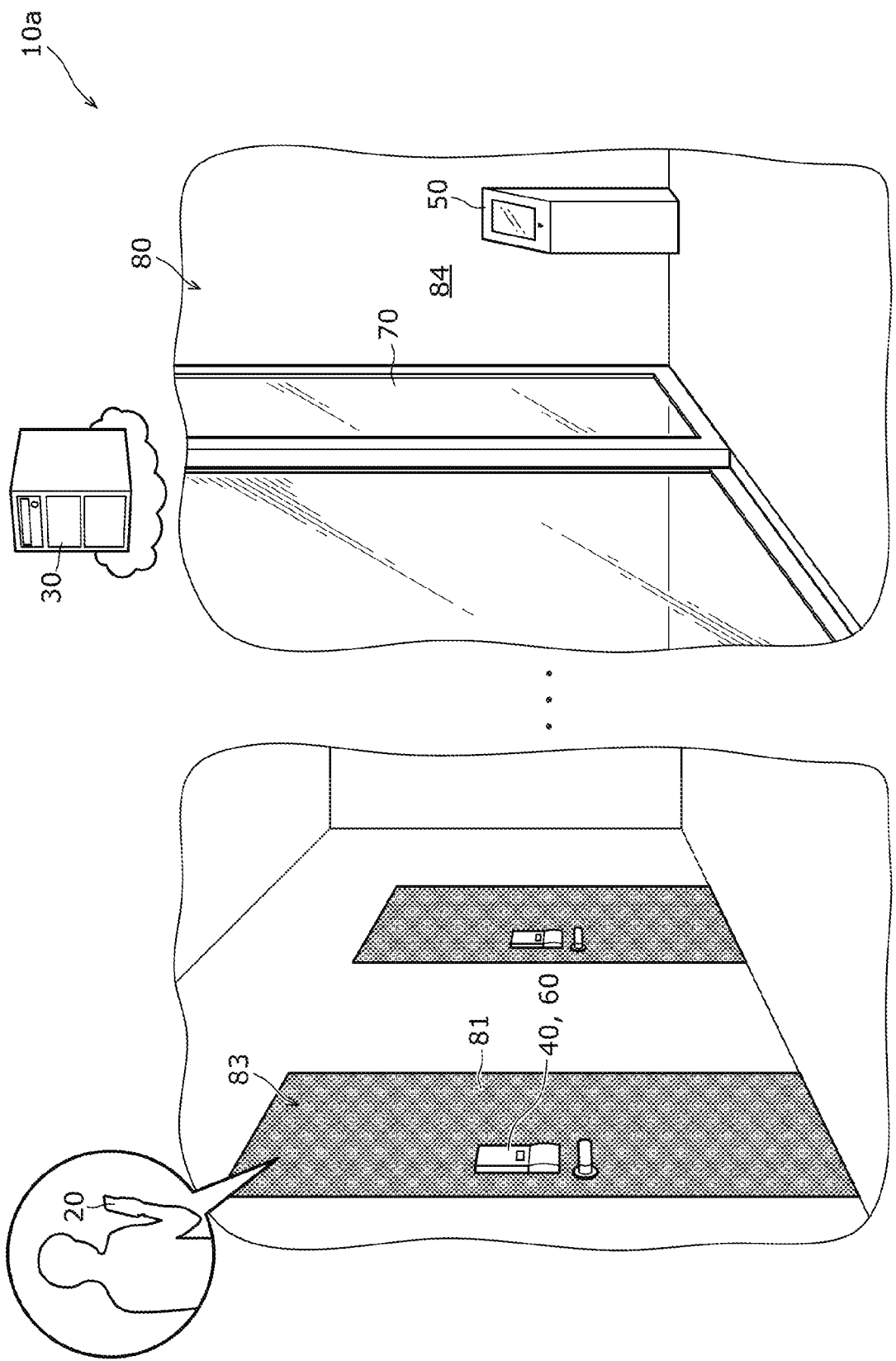
FIG. 8 is an external view of an information processing system according to Embodiment 2.
Figure 9:
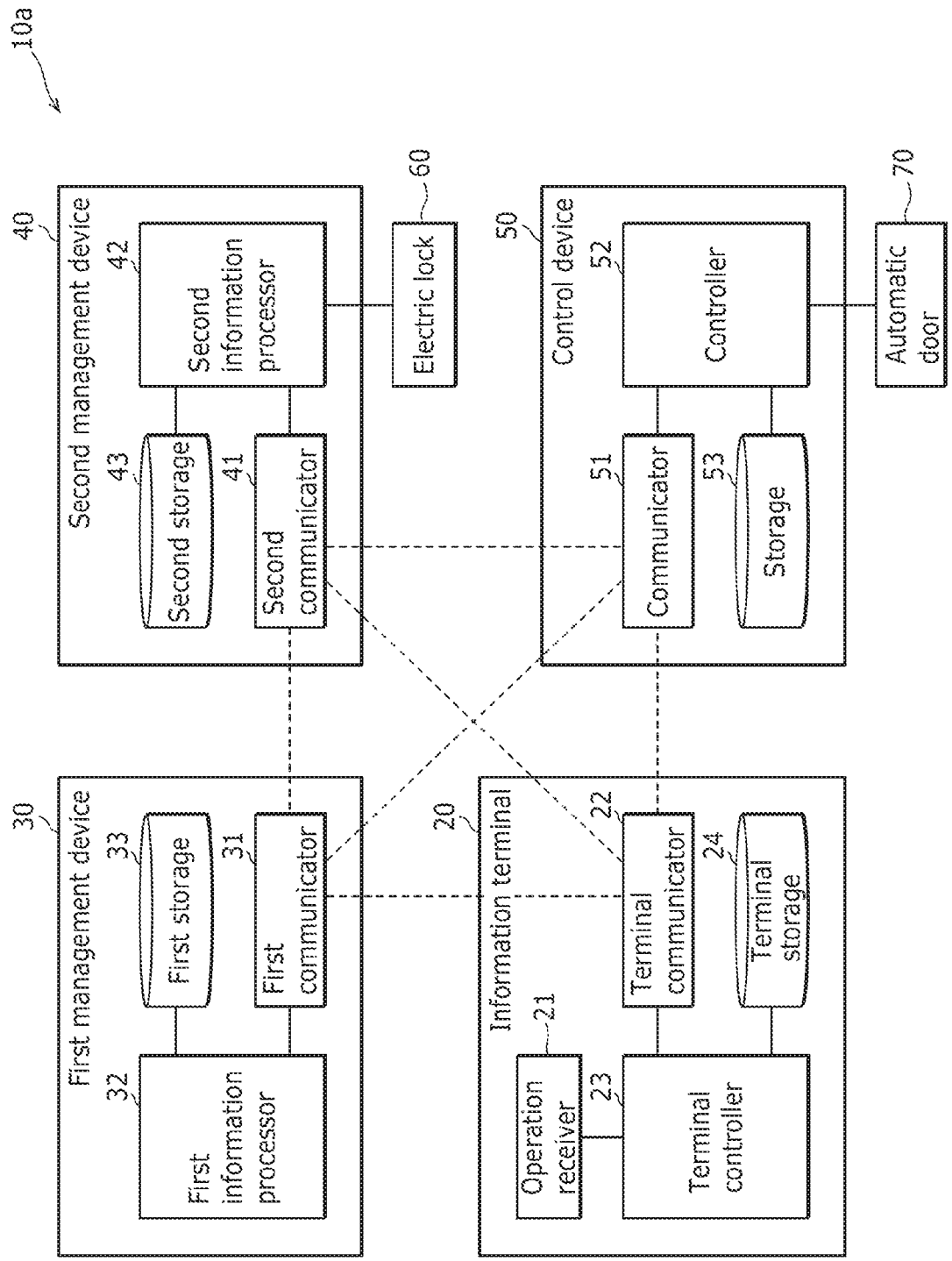
FIG. 9 is a block diagram which illustrates the functional configuration of an information processing system according to Embodiment 2.

Next, the configuration of an information processing system according to Embodiment 2 will be described. FIG. 8 is an external view of the information processing system according to Embodiment 2. FIG. 9 is a block diagram illustrating a functional configuration of the information processing system according to Embodiment 2. The following describes the differences between information processing system 10a according to Embodiment 2 and information processing system 10.

Information terminal 20 is used by a resident, not by a visitor. Second management device 40 is provided in private area 83 (specifically, on door 81 or a door frame of private area 83) on which the resident has a contract, and has the function of locking and unlocking electric lock 60. In other words, second management device 40 according to Embodiment 2 also functions as a control device for electric lock 60, and second information processor 42 is capable of locking and unlocking electric lock 60 by transmitting a control signal to electric lock 60.

Control device 50 is provided in common area 84 of facility 80. Common area 84 is specifically the entrance of facility 80. Control device 50 opens or closes automatic door 70 (auto-locking door) provided at the entrance. It should be noted that when the door provided at the entrance is a door that is manually opened or closed, control device 50 may lock and unlock the electric lock instead of automatic door 70.

Operation Example

The resident of facility 80 installs an intermediate certificate and a server certificate in terminal storage 24 of information terminal 20 at the start of residency in private area 83. The operation at this time is as described with reference to FIG. 6 of operating example 2 of Embodiment 1.

Figure 10:
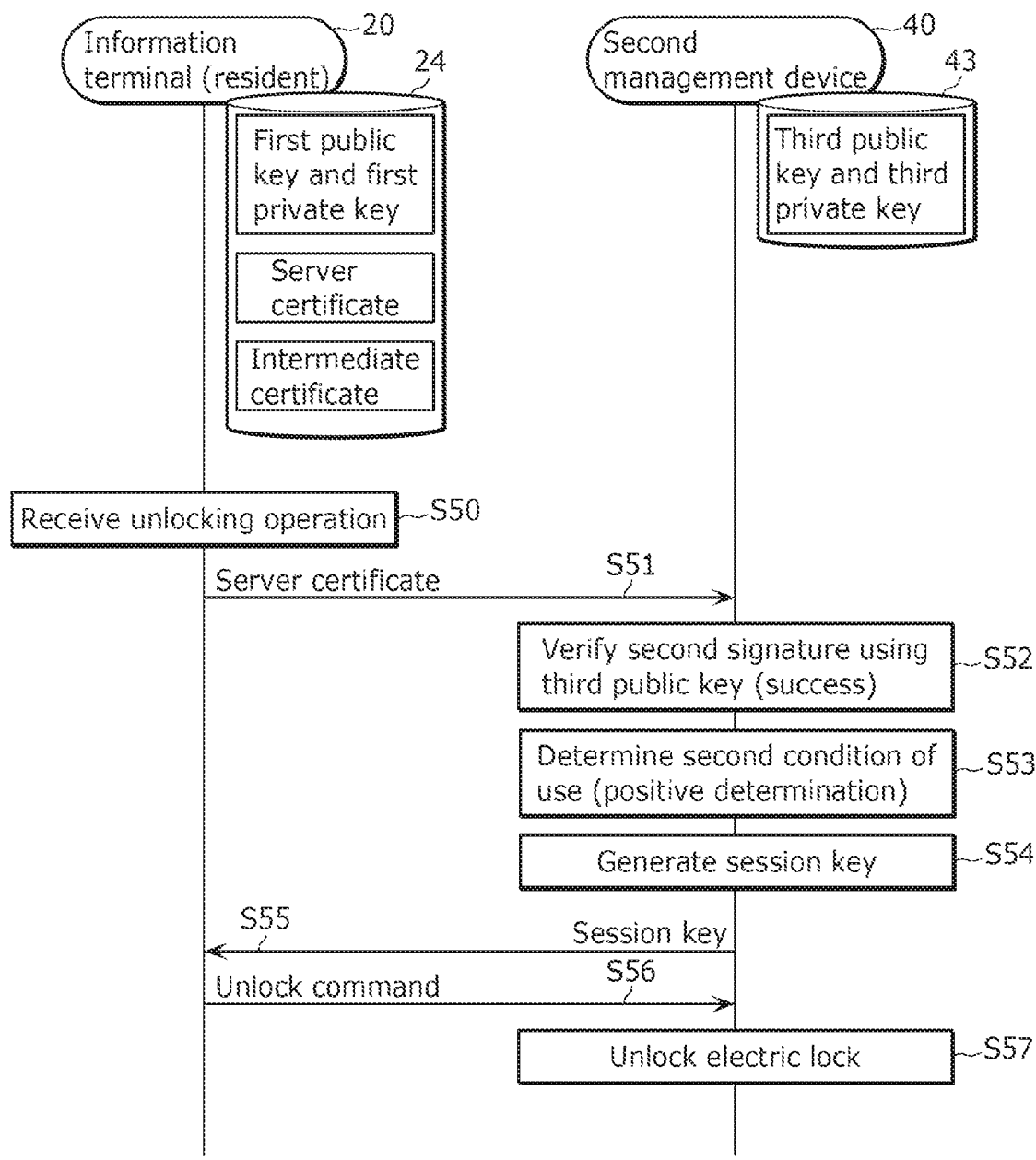
FIG. 10 is a sequence diagram of the operation example of the information processing system according to Embodiment 2.

As described above, when the intermediate certificate and the server certificate are stored in terminal storage 24 of information terminal 20, the resident can lock and unlock electric lock 60 provided in private area 83, by using information terminal 20. FIG. 10 is a sequence diagram of the operation example of information processing system 10a.

A visitor approaches door 81 and performs, on operation receiver 21 of information terminal 20 which is running an application corresponding to information processing system 10a, a predetermined unlocking operation to unlock electric lock 60. Operation receiver 21 receives the unlocking operation (S50). When the unlocking operation is received by operation receiver 21, terminal controller 23 causes terminal communicator 22 to transmit the server certificate to second management device 40. In other words, terminal communicator 22 transmits the server certificate to second management device 40 (S51). Terminal communicator 22 transmits the server certificate to second management device 40 via wireless communication through the local communication network. This wireless communication is, for example, short-distance wireless communication based on communication standards such as Bluetooth (registered trademark).

Second communicator 41 of second management device 40 receives the server certificate. Second information processor 42 verifies the second signature included in the received server certificate, using the third public key stored in second storage 43 (S52). When the second signature is successfully verified, controller 52 determines the second condition of use included in the server certificate (S53). The processes in subsequent Steps S54 through S57 are performed in the same manner as the processes performed in Steps S20 through S23 in operation example 1, and finally electric lock 60 is unlocked. It should be noted that information terminal 20 is also capable of locking electric lock 60 based on a similar sequence of operation.

In addition, when the intermediate certificate and the server certificate are stored in terminal storage 24 of information terminal 20, the resident can open automatic door 70 provided in private area 84, by using information terminal 20. The sequence diagram in this case is the same as the sequence diagram in FIG. 7, and thus the explanation is omitted.

As described above, in information processing system 10a, the resident can obtain the authority to open automatic door 70 in common area 84 when registering information terminal 20 to second management device 40 in private area 83 (that is, when obtaining the authority to unlock electric lock 60). In information processing system 10a, it is possible to grant authority to information terminal 20 even when first management device 30 and second management device 40 are not in communication connection, and thus it can be said that it is highly convenient.

Variation

Although the condition of use is included in the server certificate according to the above-described embodiment, the condition of use may be transmitted from information terminal to control device 50 in a secure manner separated from the server certificate. For example, the condition of use may be transmitted from information terminal 20 to control device 50 together with the signature of first management device 30 by encrypted communication using a session key after Step S21 in FIG. 4. As a result of separating the server certificate and the condition of use, it is possible to flexibly add or change the condition of use without having to reissue the server certificate.

In addition, according to the above-described embodiment, although control device 50 (or second management device 40 and control device 50 in information processing system 10a) controls the devices such as electric lock 60 and automatic door 70 that restrict the entry or exit of a person to or from a space in facility 80, control device 50 (or second management device and control device 50 in information processing system 10a) may control devices that restrict the entry or exit of a product. For example, control device 50 may control an electric lock that locks and unlocks the door of a delivery box, a coin-operated locker, a safe-deposit box, or the like. In other words, it is sufficient if control device 50 controls a device that restricts the entry or exit of a product or a person to or from the space.

In addition, information processing system 10 and information processing system 10a can be applied not only to devices that restrict the entry or exit of a product or a person to or from a space, but also to the case where only a certain person is permitted to control home appliances, such as a lighting device and an air conditioning equipment.

In addition, although not illustrated in the above-described example, after transmitting the server certificate in Step S17, Step S41, and Step S51, control device 50 may transmit pseudo information including a random number to information terminal 20, and information terminal 20 may sign the received pseudo information with the first private key and transmit the signed pseudo information to control device 50. Control device 50 is capable of preventing the certificate from being fraudulently used, by verifying the signature received from information terminal 20 using the first public key included in the server certificate, in the first step after Step S18, Step S42, and Step S51 but before Step S52.

In addition, it is possible to prevent a certificate of another control device from being diverted, by verifying the identification data (ID) of control device 50 included in the server certificate in the second step after Step S19, Step S43, and the above-described first step but before Step S52.

Conclusion

As described above, information processing system 10 is used to lift a restriction imposed by a first device which restricts entry or exit of a product or a person to or from a space. Information processing system 10 includes: information terminal 20; first management device 30; and control device 50. Information terminal 20 includes: terminal storage 24 in which a first private key and a first public key are stored; and terminal communicator 22 that transmits the first public key to first management device 30. First management device 30 includes: first storage 33 in which a second private key and a second public key are stored; first communicator 31 that receives the first public key from information terminal 20; and first information processor 32 that generates a signature for the first public key received, using the second private key, and causes first communicator 31 to transmit a server certificate including the first public key and the signature to first communicator 31. Terminal communicator 22 of information terminal 20 receives the server certificate from first management device 30, and transmits the server certificate received to control device 50. Control device 50 includes: storage 53 in which a root certificate including the second public key is stored; communicator 51 that receives the server certificate from information terminal 20; and controller 52 that verifies the signature included in the server certificate received, using the second public key included in the root certificate stored in storage 53, and lifts the restriction imposed by the first device when the signature is successfully verified. It should be noted that the space is, for example, any closed space within facility 80.

Information processing system 10 as described above is capable of authorizing information terminal 20 to lift a restriction on the entry or exit of a product or a person.

In addition, for example, in storage 53, an other root certificate including a second public key of another first management device 30 is stored. The other first management device 30 is, for example, second management device 40.

In information processing system 10 as described above, a plurality of first management devices 30 are each capable of authorizing information terminal 20 to lift a restriction on the entry or exit of a product or a person.

In addition, for example, first information processor 32 generates the signature for the first public key received and a condition of use, using the second private key, and causes first communicator 31 to transmit a server certificate including the first public key, the condition of use, and the signature, to information terminal 20. Controller 52 verifies the signature included in the server certificate received, using the second public key included in the root certificate stored in storage 53, and lifts the restriction imposed by the first device based on the condition of use included in the server certificate when the signature is successfully verified.

In information processing system 10 as described above, control device 50 is capable of lifting a restriction imposed by the first device, in consideration of the condition of use.

In addition, information processing system 10 is used to lift a restriction imposed by a first device which restricts entry or exit of a product or a person to or from a first space. Information processing system 10 includes: information terminal 20; first management device 30; second management device 40; and control device 50. Second management device 40 includes: second storage 43 in which a third private key and a third public key are stored; and second communicator 41 that transmits the third public key to first management device 30. First management device 30 includes: first storage 33 in which a second private key and a second public key are stored; first communicator 31 that receives the third public key from second management device 40; and first information processor 32 that generates a first signature for the third public key received, using the second private key, and causes first communicator 31 to transmit an intermediate certificate including the third public key and the first signature to second management device 40. Second communicator 41 receives the intermediate certificate from first management device 30. Information terminal 20 includes: terminal storage 24 in which a first private key and a first public key are stored; and terminal communicator 22 that transmits the first public key to second management device 40. Second communicator 41 receives the first public key from information terminal 20. Second management device 40 includes second information processor 42 that generates a second signature for the first public key received, using the third private key, and causes second communicator 41 to transmit: a server certificate including the first public key and the second signature; and the intermediate certificate received, to information terminal 20. Terminal communicator 22 receives the server certificate and the intermediate certificate from second management device 40, and transmits the server certificate received and the intermediate certificate received, to control device 50, and control device 50 includes: storage 53 in which a root certificate including the second public key is stored; communicator 51 that receives the server certificate and the intermediate certificate from information terminal 20; and controller 52 that (i) verifies the first signature included in the intermediate certificate received, using the second public key included in the root certificate, (ii) verifies the second signature included in the server certificate received, using the third public key included in the intermediate certificate, and (iii) lifts the restriction imposed by the first device when each of the first signature and the second signature is successfully verified. It should be noted that the first space is, for example, any closed space within facility 80.

Information processing system 10 as described above is capable of authorizing information terminal 20 to lift a restriction on the entry or exit of a product or a person, with second management device 40 as the intermediate CA.

In addition, for example, first information processor 32 generates the first signature for the third public key received and a first condition of use, using the second private key, and causes first communicator 31 to transmit an intermediate certificate including the third public key, the first condition of use, and the first signature, to second management device 40. Second information processor 42 generates a second signature for the first public key received and a second condition of use, using the third private key, and causes second communicator 41 to transmit: a server certificate including the first public key, the second condition of use, and the second signature; and the intermediate certificate received, to information terminal 20. Controller 52 lifts the restriction imposed by the first device based on the first condition of use included in the intermediate certificate and the second condition of use included in the server certificate, when each of the first signature and the second signature is successfully verified.

In information processing system 10 as described above, control device 50 is capable of lifting a restriction imposed by the first device, in consideration of the first condition of use and the second condition of use.

In addition, for example, the first device is electric lock 60 provided on door 81, and to lift the restriction imposed by the first device is to unlock electric lock 60.

Information processing system 10 as described above is capable of authorizing information terminal 20 to unlock electric lock 60.

In addition, for example, the first device is automatic door 70, and to lift the restriction imposed by the first device is to open automatic door 70.

Information processing system 10 as described above is capable of authorizing information terminal 20 to open automatic door 70 (automatic door 70 with an auto-locking system).

In addition, in information processing system 10a, second management device 40 has a function of lifting a restriction imposed by a second device which restricts entry or exit of a product or a person to or from a second space. Terminal communicator 22 transmits the server certificate received to second management device 40. Second communicator 41 receives the server certificate. Second information processor 42 verifies the second signature included in the server certificate received, using the third public key stored in second storage 43, and lifts the restriction imposed by the second device when the second signature is successfully verified. It should be noted that the second space is, for example, any closed space within facility 80.

Information processing system 10a as described above is capable of authorizing information terminal 20 to lift a restriction on the entry or exit of a product or a person to or from each of the first space and the second space.

In addition, the first space is common area 84 of a complex housing, and the second space is private area 83 of the complex housing.

Information processing system 10a as described above is capable of authorizing information terminal 20 to lift a restriction on the entry or exit of a product or a person to or from each of common area 84 and private area 83.

In addition, the first device is automatic door 70 provided in common area 84, to lift the restriction imposed by the first device is to open automatic door 70. The second device is electric lock 60 of door 81 provided in private area 83, and to lift the restriction imposed by the second device is to unlock electric lock 60.

Information processing system 10*a* as described above is capable of authorizing information terminal 20 to open the automatic door of common area 84 and to unlock electric lock 60 of private area 83.

In addition, the first device is an electric lock of a door provided in common area 84, and to lift the restriction imposed by the first device is to unlock the electric lock of the door provided in common area 84. The second device is electric lock 60 of door 81 provided in private area 83, and to lift the restriction imposed by the second device is to unlock electric lock 60 of door 81 provided in private area 83.

Information processing system 10*a* as described above is capable of authorizing information terminal 20 to unlock electric lock 60 provided in each of common area 84 and private area 83.

In addition, an information processing method is an information processing method executed by an information processing system that is used to lift a restriction imposed by a first device which restricts entry or exit of a product or a person to or from a space. The information processing method includes: first communication step S12 which includes transmitting, by information terminal 20, the first public key to first management device 30, and receiving, by first management device 30, the first public key from information terminal 20; generation step S13 which includes generating, by first management device 30, a signature for the first public key received, using the second private key; second communication step S14 which includes transmitting, by first management device 30, a server certificate including the first public key and the signature to information terminal 20, and receiving, by information terminal 20, the server certificate from first management device 30; third communication step S17 which includes transmitting, by information terminal 20, the server certificate received to control device 50, and receiving, by control device 50, the server certificate from information terminal 20; and control steps S18 to S23 which include: verifying, by control device 50, the signature included in the server certificate received, using the second public key included in the root certificate stored in storage 53; and lifting, by control device 50, the restriction imposed by the first device when the signature is successfully verified.

With the information processing method as described above, it is possible to authorize information terminal 20 to lift a restriction on the entry or exit of a product or a person.

In addition, an information processing method is an information processing method executed by information processing system 10 that is used to lift a restriction imposed by a first device which restricts entry or exit of a product or a person to or from a first space. The information processing method includes: first communication step S31 which includes transmitting, by second management device 40, the third public key to first management device 30, and receiving, by first management device 30, the third public key from second management device 40; first generation step S32 which includes generating, by first management device 30, a first signature for the third public key received, using the second private key; second communication step S33 which includes transmitting, by first management device 30, an intermediate certificate including the third public key and the first signature to second management device 40, and receiving, by second management device 40, the intermediate certificate from first management device 30; third communication step S36 which includes transmitting, by information terminal 20, the first public key to second management device 40, and receiving, by second management device 40, the first public key from information terminal 20; second generation step S37 which includes generating, by second management device 40, a second signature for the first public key received, using the third private key; fourth communication step S38 which includes transmitting, by second management device 40, (i) a server certificate including the first public key and the second signature and (ii) the intermediate certificate received, to information terminal 20, and receiving, by information terminal 20, the server certificate and the intermediate certificate from second management device 40; fifth communication step S41 which includes transmitting, by information terminal 20, the server certificate received and the intermediate certificate received, to control device 50, and receiving, by control device 50, the server certificate and the intermediate certificate from information terminal 20; and control steps S42 to S49 which include: verifying, by control device 50, the first signature included in the intermediate certificate received, using the second public key included in the root certificate; verifying, by control device 50, the second signature included in the server certificate received, using the third public key included in the intermediate certificate; and lifting, by control device 50, the restriction imposed by the first device when each of the first signature and the second signature is successfully verified.

With the information processing system as described above, it is possible to authorize information terminal 20 to lift a restriction on the entry or exit of a product or a person, with second management device 40 as the intermediate CA.

OTHER EMBODIMENTS

Although the embodiments have been described thus far, the present invention is not limited to the above-described embodiments.

For example, in the above-described embodiments, the information processing system has been implemented by a plurality of devices, but the information processing system may be implemented as a single device. For example, the information processing system may be implemented as a single device corresponding to any of the information terminal, the first management device, the second management device, and the control device. When the information processing system is implemented by a plurality of devices, the structural components (in particular, the functional structural components) included in the information processing system may be distributed in any manner to the plurality of devices.

In addition, in the above-described embodiments, a process performed by a specific processing unit may be performed by a different processing unit. Furthermore, the order of a plurality of processes may be rearranged. Alternatively, the plurality of processes may be performed in parallel.

In addition, each of the structural components in the above-described embodiments may be implemented by executing a software program suitable for the structural component. Each of the structural components may be implemented by means of a program executing unit, such as a central processing unit (CPU) and a processor, reading and executing the software program recorded on a recording medium such as a hard disk or a semiconductor memory.

In addition, each of the structural components may be implemented by hardware. For example, each of the structural components may be a circuitry (or an integrated circuit). The circuitries may be configured as a single circuitry as a whole or may be mutually different circuitries. In addition, the circuitries may each be a general-purpose circuit, or may be a dedicated circuit.

In addition, the generic or specific aspects of the present invention may be implemented by a system, a device, a method, an integrated circuit, a computer program, or a computer-readable recording medium such as a compact disc read only memory (CD-ROM). Alternatively, the generic or specific aspects of the present invention may be implemented by any combination of systems, devices, methods, integrated circuits, computer programs, and recording medium.

For example, the present invention may be implemented as the information terminal, the first management device, the second management device, the control device, or the electric lock system (control device and electric lock) according to the above-described embodiments.

Alternatively, the present invention may be implemented as an information processing method executed by a computer such as the information processing system according to the above-described embodiments. In addition, the present invention may be implemented as a program for causing a computer to execute the information processing method. The present invention may be implemented as a non-transitory computer-readable recording medium on which the above-described program is stored.

In addition, the present invention may be implemented as an application program for causing a general-purpose information terminal to function as the information terminal according to the foregoing embodiments. The present invention may be implemented as a non-transitory computer-readable recording medium on which the above-described application program is stored.

It should be noted that the present invention also includes other forms in which various modifications apparent to those skilled in the art are applied to the embodiments or forms in which structural components and functions in the embodiments are arbitrarily combined within the scope of the present invention.

The invention claimed is:

1. An information processing system that is used to lift a restriction imposed by a first device which restricts entry or exit of a product or a person to or from a space, the information processing system comprising:
    an information terminal; a first management device; and a control device, wherein
    the information terminal includes:
    a terminal storage in which a first private key and a first public key are stored; and
    a terminal communicator that transmits the first public key to the first management device,
    the first management device includes:
    a first storage in which a second private key and a second public key are stored;
    a first communicator that receives the first public key from the information terminal; and
    a first information processor that generates a signature for the first public key received, using the second private key, and causes the first communicator to transmit a server certificate including the first public key and the signature to the information terminal,
    the terminal communicator of the information terminal receives the server certificate from the first management device, and transmits the server certificate received to the control device, and
    the control device includes:
    a storage in which a root certificate including the second public key is stored;
    a communicator that receives the server certificate from the information terminal; and
    a controller that verifies the signature included in the server certificate received, using the second public key included in the root certificate stored in the storage, and lifts the restriction imposed by the first device when the signature is successfully verified.

2. The information processing system according to claim 1, wherein
    in the storage, an other root certificate including a second public key of an other first management device is stored.

3. The information processing system according to claim 1, wherein
    the first information processor generates the signature for the first public key received and a condition of use, using the second private key, and causes the first communicator to transmit a server certificate including the first public key, the condition of use, and the signature, to the information terminal, and
    the controller verifies the signature included in the server certificate received, using the second public key included in the root certificate stored in the storage, and lifts the restriction imposed by the first device based on the condition of use included in the server certificate when the signature is successfully verified.

4. An information processing system that is used to lift a restriction imposed by a first device which restricts entry or exit of a product or a person to or from a first space, the information processing system comprising:
    an information terminal; a first management device; a second management device; and a control device, wherein
    the second management device includes:
    a second storage in which a third private key and a third public key are stored; and
    a second communicator that transmits the third public key to the first management device,
    the first management device includes:
    a first storage in which a second private key and a second public key are stored;
    a first communicator that receives the third public key from the second management device; and
    a first information processor that generates a first signature for the third public key received, using the second private key, and causes the first communicator to transmit an intermediate certificate including the third public key and the first signature to the second management device,
    the second communicator receives the intermediate certificate from the first management device,
    the information terminal includes:
    a terminal storage in which a first private key and a first public key are stored; and
    a terminal communicator that transmits the first public key to the second management device,
    the second communicator receives the first public key from the information terminal,
    the second management device includes a second information processor that generates a second signature for the first public key received, using the third private key, and causes the second communicator to transmit: a server certificate including the first public key and the second signature; and the intermediate certificate received, to the information terminal, the terminal communicator receives the server certificate and the intermediate certificate from the second management device, and transmits the server certificate received and the intermediate certificate received, to the control device, and the control device includes:

a storage in which a root certificate including the second public key is stored;

a communicator that receives the server certificate and the intermediate certificate from the information terminal; and a controller that (i) verifies the first signature included in the intermediate certificate received, using the second public key included in the root certificate, (ii) verifies the second signature included in the server certificate received, using the third public key included in the intermediate certificate, and (iii) lifts the restriction imposed by the first device when each of the first signature and the second signature is successfully verified.

5. The information processing system according to claim 4, wherein
the first information processor generates the first signature for the third public key received and a first condition of use, using the second private key, and causes the first communicator to transmit an intermediate certificate including the third public key, the first condition of use, and the first signature, to the second management device,
the second information processor generates a second signature for the first public key received and a second condition of use, using the third private key, and causes the second communicator to transmit: a server certificate including the first public key, the second condition of use, and the second signature; and the intermediate certificate received, to the information terminal, and
the controller lifts the restriction imposed by the first device based on the first condition of use included in the intermediate certificate and the second condition of use included in the server certificate, when each of the first signature and the second signature is successfully verified.

6. The information processing system according to claim 1, wherein
the first device is an electric lock provided on a door, and
to lift the restriction imposed by the first device is to unlock the electric lock.

7. The information processing system according to claim 1, wherein
the first device is an automatic door, and
to lift the restriction imposed by the first device is to open the automatic door.

8. The information processing system according to claim 4, wherein
the second management device has a function of lifting a restriction imposed by a second device which restricts entry or exit of a product or a person to or from a second space,
the terminal communicator transmits the server certificate received to the second management device,
the second communicator receives the server certificate, and
the second information processor verifies the second signature included in the server certificate received, using the third public key stored in the second storage, and lifts the restriction imposed by the second device when the second signature is successfully verified.

9. The information processing system according to claim 8, wherein
the first space is a common area of a complex housing, and
the second space is a private area of the complex housing.

10. The information processing system according to claim 9, wherein
the first device is an automatic door provided in the common area,
to lift the restriction imposed by the first device is to open the automatic door,
the second device is an electric lock of a door provided in the private area, and
to lift the restriction imposed by the second device is to unlock the electric lock.

11. The information processing system according to claim 9, wherein
the first device is an electric lock of a door provided in the common area,
to lift the restriction imposed by the first device is to unlock the electric lock of the door provided in the common area,
the second device is an electric lock of a door provided in the private area, and
to lift the restriction imposed by the second device is to unlock the electric lock of the door provided in the private area.

12. An information processing method executed by an information processing system that is used to lift a restriction imposed by a first device which restricts entry or exit of a product or a person to or from a space,
the information processing system including:
an information terminal including a terminal storage in which a first private key and a first public key are stored;
a first management device including a first storage in which a second private key and a second public key are stored; and
a control device including a storage in which a root certificate including the second public key is stored,
the information processing method comprising:
transmitting, by the information terminal, the first public key to the first management device, and receiving, by the first management device, the first public key from the information terminal;
generating, by the first management device, a signature for the first public key received, using the second private key;
transmitting, by the first management device, a server certificate including the first public key and the signature to the information terminal, and receiving, by the information terminal, the server certificate from the first management device;
transmitting, by the information terminal, the server certificate received to the control device, and receiving, by the control device, the server certificate from the information terminal; and
verifying, by the control device, the signature included in the server certificate received, using the second public key included in the root certificate stored in the storage, and lifting, by the control device, the restriction imposed by the first device when the signature is successfully verified.

13. An information processing method executed by an information processing system that is used to lift a restriction imposed by a first device which restricts entry or exit of a product or a person to or from a first space, the information processing system including:

an information terminal including a terminal storage in which a first private key and a first public key are stored;

a first management device including a first storage in which a second private key and a second public key are stored;

a second management device including a second storage in which a third private key and a third public key are stored; and a control device including a storage in which a root certificate including the second public key is stored, the information processing method comprising:

transmitting, by the second management device, the third public key to the first management device, and receiving, by the first management device, the third public key from the second management device;

generating, by the first management device, a first signature for the third public key received, using the second private key;

transmitting, by the first management device, an intermediate certificate including the third public key and the first signature to the second management device, and receiving, by the second management device, the intermediate certificate from the first management device;

transmitting, by the information terminal, the first public key to the second management device, and receiving, by the second management device, the first public key from the information terminal;

generating, by the second management device, a second signature for the first public key received, using the third private key;

transmitting, by the second management device, (i) a server certificate including the first public key and the second signature and (ii) the intermediate certificate received, to the information terminal, and receiving, by the information terminal, the server certificate and the intermediate certificate from the second management device;

transmitting, by the information terminal, the server certificate received and the intermediate certificate received, to the control device, and receiving, by the control device, the server certificate and the intermediate certificate from the information terminal; and verifying, by the control device, the first signature included in the intermediate certificate received, using the second public key included in the root certificate, verifying, by the control device, the second signature included in the server certificate received, using the third public key included in the intermediate certificate, and lifting, by the control device, the restriction imposed by the first device when each of the first signature and the second signature is successfully verified.

14. A non-transitory computer-readable recording medium having recorded thereon a computer program for causing a computer to execute the information processing method according to claim 12.

15. A non-transitory computer-readable recording medium having recorded thereon a computer program for causing a computer to execute the information processing method according to claim 13.

* * * * *